United States Patent [19]

St. Clair

[11] 4,248,759

[45] Feb. 3, 1981

[54] CONSTRUCTION ADHESIVE

[75] Inventor: David J. St. Clair, Houston, Tex.

[73] Assignee: Shell Oil Company, Houston, Tex.

[21] Appl. No.: 74,599

[22] Filed: Sep. 12, 1979

[51] Int. Cl.$^3$ .............................................. C08K 5/01
[52] U.S. Cl. .............................................. 260/33.6 A
[58] Field of Search .................................. 260/33.6 A

[56] References Cited

U.S. PATENT DOCUMENTS

| | | | |
|---|---|---|---|
| 3,239,478 | 3/1966 | Harlan | 260/27 |
| 3,281,383 | 10/1966 | Zelinski et al. | 260/23.7 |
| 3,993,613 | 11/1976 | Doss et al. | 260/33.6 A |
| 4,178,275 | 12/1979 | Hsieh et al. | 260/33.6 A |

*Primary Examiner*—Lewis T. Jacobs
*Attorney, Agent, or Firm*—Dean F. Vance

[57] ABSTRACT

A construction adhesive is described which is particularly useful in attaching foamed polystyrene sheets to substrates. These adhesives comprise a particular linear or radial ABA-type monoalkenyl arene-conjugated diene block copolymer and a mixed cyclohexane/normal hexane solvent.

10 Claims, No Drawings

CONSTRUCTION ADHESIVE

BACKGROUND OF THE INVENTION

One of the recent advances in the construction industry has been the use of foamed polystyrene sheets for insulation in homes and businessss. These sheets are typically attached to the walls or framework with construction mastic adhesives. The presently used mastic for bonding polystyrene foam is based on a random SBR. However, this mastic has low shear strength, making it less than desirable for many applications. One of the problems in developing a high shear strength mastic, e.g., one based on commercially available SBS block copolymers, is that the solvents typically employed with the mastic will also affect the polystyrene foam causing the foam to collapse. What is required is a high shear strength mastic that will not cause the polystyrene foam to collapse.

SUMMARY OF THE INVENTION

The present invention comprises a solvent-based adhesive useful for adhering foamed polystyrene sheets to substrates and which does not cause the foamed polystyrene to collapse. This adhesive broadly comprises a specific block copolymer and a two-component solvent mixture. Specifically, the adhesive comprises:
(a) a linear or radial ABA-type block copolymer where the A blocks are polymer blocks of monoalkenyl arenes, the B blocks are polymer blocks of conjugated dienes, the weight average molecular weight of said A blocks is about 10,500 to about 12,500, and the weight percent of monoalkenyl arene in said block copolymer is between about 16 percent and about 26 percent; and
(b) a solvent comprising a mixture of 5 to 30 weight percent of a cycloaliphatic solvent such as cyclohexane, and 95 to 70 weight percent of a paraffinic or isoparaffinic solvent such as normal hexane. Examples of useful cycloaliphatic solvents include cyclohexane and methylcyclohexane. Examples of useful paraffinic or isoparaffinic solvents include normal hexane, isohexane, pentane, isopentane, heptane and isoheptane.

In a preferred embodiment, the two solvents employed are cyclohexane and normal hexane and the block copolymer is an SBS linear block copolymer. As discussed below, the adhesive may also contain other components such as fillers, tackifying resins, stiffening resins and the like.

There are a number of important aspects to the present invention. For one, the block copolymer has certain end block molecular weights and a certain range of monoalkenyl arene content. Below 10,500 end block molecular weight and above about 26 percent monoalkenyl arene, the polymers give adhesive viscosities which are too low. Below about 16 percent monoalkenyl arene, the rate of build of shear strength of the adhesive as solvent evaporates is too slow. Above 12,500 molecular weight end blocks, the polymer will not dissolve in the required solvent. A particularly effective polymer is a linear or radial S-B-S polymer having 12,000 molecular weight end blocks and 22 percent weight styrene.

The solvent system employed in the present invention is also important. This solvent system comprises 5 to 30 weight percent of a good polystyrene solvent and 95 to 70 weight percent of a poor polystyrene solvent. It has been found that, although this mixed solvent system causes polystyrene foam to shrink, this solvent system does not cause the foam to collapse and dissolve. It has also been shown that below a 5:95 ratio of cyclohexane to normal hexane, the SBS block copolymer will not dissolve. Above a 30:70 ratio, the solvent mixture causes the polystyrene foam to dissolve. In a preferred embodiment, the ratio of cyclohexane to normal hexane is 10:90.

DETAILED DESCRIPTION OF THE INVENTION

The block copolymer component of the present invention is a linear or radial ABA-type block copolymer. The A blocks are blocks of monoalkenyl arenes. Preferably, the A blocks are polymer blocks of styrene. Other useful monoalkenyl arenes include alphamethyl styrene, tert-butyl styrene and other ring-alkylated styrenes. The B blocks are blocks of conjugated dienes. Preferred dienes include butadiene and isoprene, with butadiene being the most preferred.

The linear ABA type block copolymer is described in Harlan, U.S. Pat. No. 3,239,478. Typical structures include polystyrene-polyisoprene-polystyrene and polystyrene-polybutadiene-polystyrene, with the latter being most preferred. The radial ABA-type block copolymers are described in U.S. Pat. No. 3,281,383 and have the formula $(AB)_x BA$ where x varies from 2 to 15, preferably 2 to 6. The weight percentage of A blocks in the linear or radial ABA-type block copolymers is between 16 and 26 percent, preferably about 21 to 25 percent.

The average molecular weights of the A blocks are important. The monoalkenyl arene polymer blocks preferably have average molecular weights between about 10,500 and 12,500, more preferably about 11,500. The elastomeric conjugated diene polymer blocks preferably have average molecular weights between about 60,000 and about 130,000, these molecular weights being set by the molecular weight of the A blocks and the percent monoalkenyl arene. The average molecular weights of the monoalkenyl arene polymer end blocks are determined by gel permeation chromotography, whereas the monoalkenyl arene polymer content of the block copolymer is measured by infrared spectroscopy of the finished block polymer.

The solvent system is broadly described in the Summary of the Invention. The amount of solvent employed should be sufficient to give an adhesive which can be readily extruded at ambient temperatures but not so great that the adhesive flows excessively when applied to a vertical substrate. Preferred amounts of the solvent mixture are about 100 to about 800 parts by weight per hundred parts by weight block copolymer rubber (phr), more preferably about 200 to about 500 phr.

The construction adhesives of the present inventions may also include a variety of other ingredients such as fillers, tackifying resins, end-block stiffening resins, antioxidants and the like.

Tackifying resins which are useful in the compositions of this invention include hydrogenated resins, resin esters, polyterpenes, terpene-phenol resins, and polymerized mixed olefins, such as those described in Harlan, U.S. Pat. No. 3,239,478. The resins normally have softening points (ring and ball) between about 80° and about 115° C. Mixtures of resins having high and low softening points may be used. A preferred resin is a resinous copolymer of 20–80 weight percent piperylene and 80–20 weight percent 2-methyl-2-butene having a softening point of about 95° C. Such a resin is available commercially under the tradename Wingtack 95, and is prepared by the cationic polymerization of 60% piperylene, 10% isoprene, 5% cyclopentadiene, 15% 2-methyl-2-butene and about 10% dimer (see U.S. Pat. No. 3,577,398).

The amount of tackifying resin employed varies from about 0 to about 300 parts per hundred rubber (phr), preferably, between about 50 and about 150 phr.

Optionally, an arene-block-compatible resin may be employed, said compatibility being judged by the method disclosed in U.S. Pat. No. 3,917,607. Normally, the resin should have a softening point above about 100° C., as determined by ASTM method E 28, using a ring and ball apparatus. Mixtures of arene-block-compatible resins having high and low softening points may also be used. Useful resins include coumaroneindene resins, polystyrene resins, vinyl toluene-alphamethyl styrene copolymers, and polyindene resins. Much preferred is a coumarone-indene resin. The amount of arene-block-compatible resin varies from about 0 to about 200 phr, preferably about 50 to about 100 phr.

Useful fillers include clay, talc, calcium carbonate, silica and slate dust. A preferred filler is calcium carbonate. The amount of filler varies from about 0 to about 600 phr, preferably about 250 to about 400 phr.

The compositions of this invention may be modified with supplementary materials including pigments, stabilizers, oxidation inhibitors and the like. Stabilizers and oxidation inhibitors are typically added to the compounds in order to protect the polymers against degradation during preparation and use of the adhesive composition. Combinations of stabilizers are often more effective, due to the different mechanisms of degradation possible in various polymer systems. Certain hindered phenols, organo-metallic compounds, aromatic amines and sulfur compounds are useful for this purpose. Especially effective types of these materials include the following:

1. Benzothiazoles, such as 2-(dialkyl-hydroxybenzylthio)benzothiazoles.
2. Esters of hydroxybenzyl alcohol, such as benzoates, phtalates, stearates, adipates or acrylates of 3,5-dialkyl-1-hydroxybenzyl alcohols.
3. Stannous phenyl catecholates.
4. Zinc dialkyl dithiocarbamates.
5. Alkyl phenols, e.g., 2,6-di-tert-butyl-4-methyl phenol.
6. Dilaurylthio-dipropionate.

Examples of commercially available antioxidants are "Ionox 220" 4,4-methylene-bis(2,6-di-t-butyl-phenol), "Ionox 330" 3,4,6-tris(3,5-di-t-butyl-p-hydroxybenzyl)-p-cresol, "Naugawhite" alkylated bisphenol, "Butyl Zimate" zinc dibutyl dithiocarbamate, and "Agerite Geltrol" alkylated-arylated bis-phenolic phosphite.

From about 0.01 percent to about 5.0 percent by weight of one or more antioxidants is generally added to the adhesive composition.

The invention is further illustrated by means of the following which is given for the purpose of illustration alone and is not meant to limit the invention to the particular reactants and amounts disclosed.

ILLUSTRATIVE EMBODIMENT I

It is known that aromatic or pure cycloaliphatic solvents cause polystyrene foam to dissolve and collapse. In making an adhesive for use on polystyrene foam, one would prefer to use only paraffinic solvents since these are generally poor solvents for polystyrene. However, in an adhesive based on an S-B-S block copolymer, at least a small amount of a good polystyrene solvent must be used in order to be able to dissolve the polymer. Thus, to develop a satisfactory solvent system for this type of adhesive, one must find a solvent blend which contains enough good polystyrene solvent to dissolve the S-B-S polymer but not so much that is causes the polystyrene foam to dissolve. The best S-B-S polymer for this application is one which will dissolve in a solvent containing a minimum of good polystyrene solvent and give high viscosity in that solvent.

To exemplify the development of a satisfactory polymer and a satisfactory solvent system, cyclohexane was chosen as the good polystyrene solvent and normal hexane as the poor polystyrene solvent. To establish the maximum amount of cyclohexane which could be used in the blend, strips of polystyrene foam were soaked for 3 weeks at room temperature in solvents consisting of 100/0, 50/50, 25/75, 10/90 and 0/100 ratios of cyclohexane to normal hexane (ratios are calculated on a weight basis). In the 100/0 (pure cyclohexane) and 50/50 blends, the polystyrene foam dissolved in less than 1 hour. In the 25/75 and 10/90 blends, the polystyrene foam shrunk by about 50% (a 2 inch long strip shrunk to about 1 inch length after soaking). Perhaps surprisingly, in the 0/100 blend (pure normal hexane), shrinkage of the polystyrene foam was still about 40%. Thus, blends of cyclohexane and normal hexane containing up to 25% cyclohexane are reasonable candidates as a solvent system for the adhesive.

The effectiveness of various polymers in the various blends of cyclohexane and normal hexane is demonstrated by the data in the table. None of the polymers will dissolve in the 0/100 blend (pure normal hexane). Polymers A-E all dissolve in the blend containing as little as 10% w cyclohexane. Polymer A is unsuitable for use in the adhesive because its viscosity in the 10/90 solvent blend is too low. The viscosity of Polymer F in the 25/75 blend is much too high to handle easily. Therefore, more than 25% cyclohexane would be required in the solvent blend to reduce the viscosity of Polymer F to a manageable level and excessive shrinkage of the polystyrene foam would be expected.

TABLE

| ID | Polymer | % S | Structure[a] | Viscosity[b] in Cyclohexane/n-hexane Blends at ratios (by weight) | | | | |
|----|---------|-----|-----------|-------|-------|-------|--------|-------|
| | | | | 100/0 | 50/50 | 25/75 | 10/90 | 0/100 |
| A. | S-B-S (10-47-10) | 30 | Linear | 150 | 70 | 400 | 8,000 | [c] |
| B. | S-B-S (12-72-12) | 25 | Linear | 300 | — | 1,400 | 22,000 | [c] |
| C. | S-B-S (12-72-12) | 25 | Radial | 400 | — | 2,600 | 47,000 | [c] |
| D. | S-B-S (12-110-12) | 18 | Linear | 1,200 | — | 2,200 | 27,000 | [c] |
| E. | S-B-S (12-110-12) | 18 | Radial | 1,500 | — | 3,800 | 77,000 | [c] |

TABLE-continued

| | | | Viscosity[b] in Cyclohexane/n-hexane Blends at ratios (by weight) | | | | |
|---|---|---|---|---|---|---|---|
| ID Polymer | % S | Structure[a] | 100/0 | 50/50 | 25/75 | 10/90 | 0/100 |
| F. S-B-S (16-75-16) | 30 | Linear | 450 | 890 | 1,000,000 | c | c |

[a]All polymers were coupled to about 80% coupling yield. The linear polymers were formed by coupling 2 S-B arms. The average number of S-B arms coupled in the radial polymers was about 3.5.
[b]Brookfield viscosity of 15% w solutions of polymer in solvent at 25° C., centipoise
[c]Phase separated.

What is claimed is:

1. A solvent-based adhesive useful for adhering foamed polystyrene sheets to substrates, said adhesive comprising:
   (a) a linear or radial ABA-type block copolymer where the A blocks are polymer blocks of monoalkenyl arenes, the B blocks are polymer blocks of conjugated dienes, the weight average molecular weight of said A blocks is about 10,500 to about 12,500, and the weight percent of monoalkenyl arene in said block copolymer is between about 16 percent and about 26 percent; and
   (b) a solvent comprising a mixture of 5 to 30 weight percent of a cycloaliphatic solvent and 95 to 70 weight percent of a paraffinic or isoparaffinic solvent.

2. A composition according to claim 1 wherein said solvent mixture comprises normal hexane and cyclohexane.

3. A composition according to claims 1 or 2 wherein said block copolymer is a linear styrene-butadiene-styrene block copolymer.

4. A composition according to claim 3 wherein said styrene block molecular weight is about 12,800 and the weight percent styrene of said block copolymer is about 22 percent.

5. A composition according to claim 2 wheren the amount of normal hexane in said solvent mixture is 90% and the amount of cyclohexane is 10%.

6. A composition according to claim 1 wherein the amount of block copolymer is 100 parts by weight and the amount of solvent mixture is 100 to 800 parts by weight.

7. A composition according to claim 6 also including 0 to 600 parts by weight of a filler.

8. A composition according to claim 6 also including 0 to 200 parts by weight of an A block compatible resin.

9. A composition according to claim 6 also including 0 to 300 parts by weight of a tackifying resin.

10. A composition according to claim 1 wherein said cycloaliphatic solvent is selected from the group consisting of cyclohexane and methylcyclohexane and said paraffinic or isoparaffinic solvent is selected from the group consisting of normal hexane, isohexane, pentane, isopentane, heptane and isoheptane.

* * * * *